(12) United States Patent
Hsu et al.

(10) Patent No.: US 7,191,371 B2
(45) Date of Patent: Mar. 13, 2007

(54) SYSTEM AND METHOD FOR SEQUENTIAL TESTING OF HIGH SPEED SERIAL LINK CORE

(75) Inventors: Louis L. Hsu, Fishkill, NY (US); Li-Kong Wang, Montvale, NJ (US)

(73) Assignee: Internatioanl Business Machines Corporation, Armonk, NY (US)

( * ) Notice: Subject to any disclaimer, the term of this patent is extended or adjusted under 35 U.S.C. 154(b) by 1089 days.

(21) Appl. No.: 10/118,751

(22) Filed: Apr. 9, 2002

(65) Prior Publication Data

US 2003/0189903 A1 Oct. 9, 2003

(51) Int. Cl.
 *G01R 31/28* (2006.01)
(52) U.S. Cl. .................. 714/717; 714/716; 714/733
(58) Field of Classification Search ............... 375/221; 707/100; 341/100; 370/386; 714/727, 717, 714/716, 733
See application file for complete search history.

(56) References Cited

U.S. PATENT DOCUMENTS

| | | | | |
|---|---|---|---|---|
| 5,787,114 A | * | 7/1998 | Ramamurthy et al. | 375/221 |
| 5,956,370 A | * | 9/1999 | Ducaroir et al. | 375/221 |
| 6,542,096 B2 | * | 4/2003 | Chan et al. | 341/100 |
| 6,581,063 B1 | * | 6/2003 | Kirkman | 707/100 |
| 6,661,786 B1 | * | 12/2003 | Abbiate et al. | 370/386 |
| 6,701,476 B2 | * | 3/2004 | Pouya et al. | 714/727 |

\* cited by examiner

*Primary Examiner*—David Ton
(74) *Attorney, Agent, or Firm*—Rafael Perez-Pineiro, Esq.

(57) ABSTRACT

A testing circuit for testing a series of at least three alternating transmitter and receiver links. The testing circuit including a built-in-self-test (BIST.) macro for generating test data and transmitting the test data to a first link of the series of transmitter and receiver links, and for receiving processed test data from a last link of the series of transmitter receiver links; and at least one test transmission line for transmitting test data received by a link of the series of transmitter and receiver links to a next link of the series of transmitter and receiver links, wherein the at least one test transmission line connects the at least three transmitter and receiver links. A method for testing a series of links having at least three alternating transmitter and receiver links of a plurality of transmitter and receiver links in a SerDes core including generating at least one test data signal; transmitting the at least one test data signal sequentially through the transmitter and receiver links of the series of links; receiving the at least one test data signal from a last link of the series of transmitter and receiver links; and checking the at least one test data signal received.

21 Claims, 7 Drawing Sheets

SYSTEM AND METHOD FOR SEQUENTIAL TESTING OF HIGH SPEED SERIAL LINK CORE

BACKGROUND OF THE INVENTION

1. Field of the Invention

The present invention relates to data communication, and more specifically, to a system and method for sequentially testing a high-speed serialization and deserialization (SerDes) core.

2. Description of the Related Art

Data communication, such as over cables and backplane traces and between computer chips, cards, systems etc., is commonly provided by serialization and deserialization (SerDes) cores providing high speed and high bandwidth data communication. SerDes cores are often used instead of parallel data buses that provide moderate data transfer rates.

Figure 1:
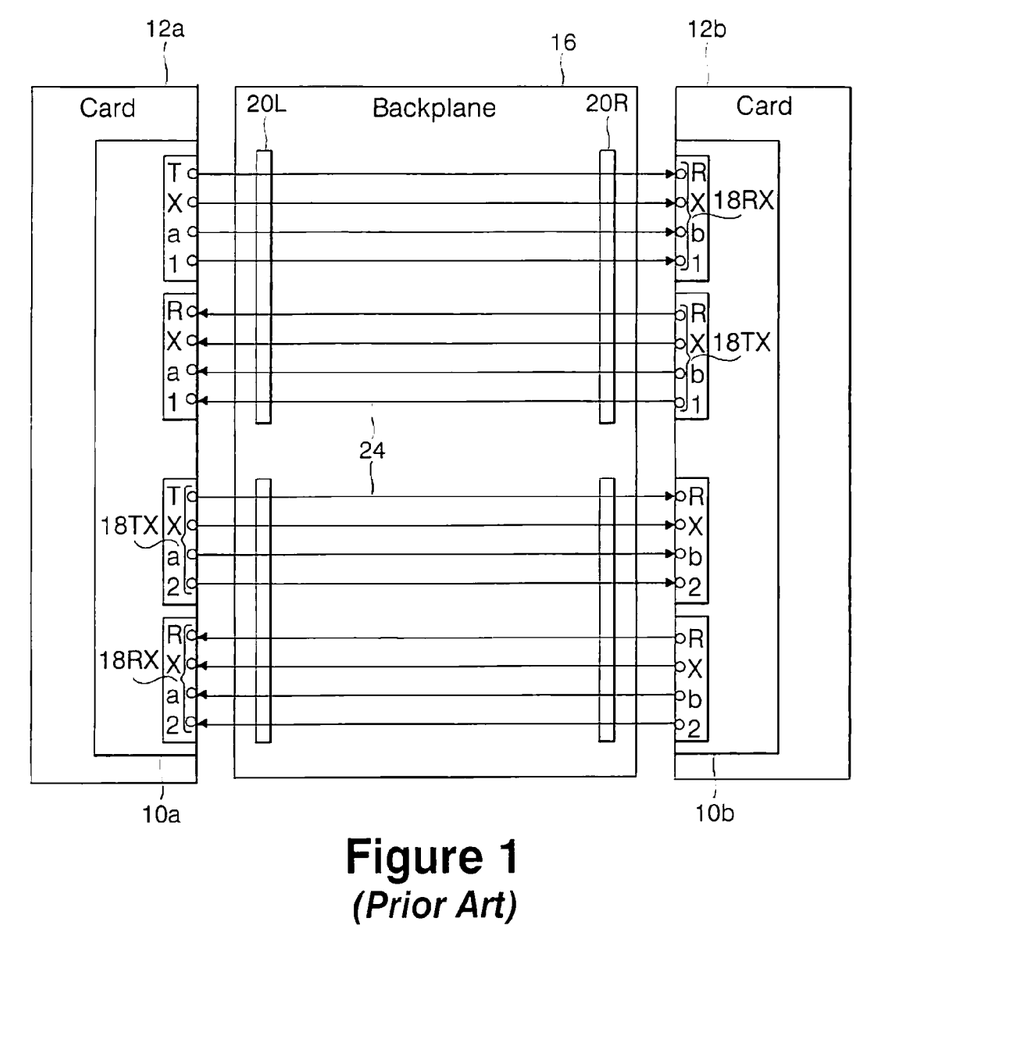
FIG. 1 is a block diagram of a conventional serialization and deserialization (SerDes) core in a backplane environment.

FIG. 1 shows a pair of exemplary SerDes cores 10a and 10b for providing data communication between a first card 12a and a second card 12b across a backplane 16. SerDes core 10a includes transmitter blocks TXa1 and TXa2 and receiver blocks RXa1 and RXa2. SerDes core 10b includes transmitter blocks TXb1 and TXb2 and receiver blocks RXb1 and RXb2. Each receiver and transmitter block includes four links 18RX and 18TX, respectively.

Data is transmitted from card 12a to card 12b by transmitting the data from the links of transmitters TXa1, TXa2 of SerDes core 10a to respective left connectors 20L of backplane 16. The data is transmitted across respective cables 24 to corresponding respective right connectors 20R. The data is received by the links of respective receivers RXb1 and RXb2 of SerDes core 10b. Data is transmitted from card 10b to card 10a in a similar fashion but in the reverse direction. Typically each SerDes core 10a, 10b has an equal number of transmitter and receiver links for enabling communication in both directions between cards 12a and 12b.

Testing of a SerDes core such as SerDes cores 10a and 10b is time consuming and requires many Built-In-Self-Test (BIST) circuits that consume valuable space and power. Furthermore, if any link fails to function properly during a test, the whole chip on which the link is housed is discarded.

Figure 2:
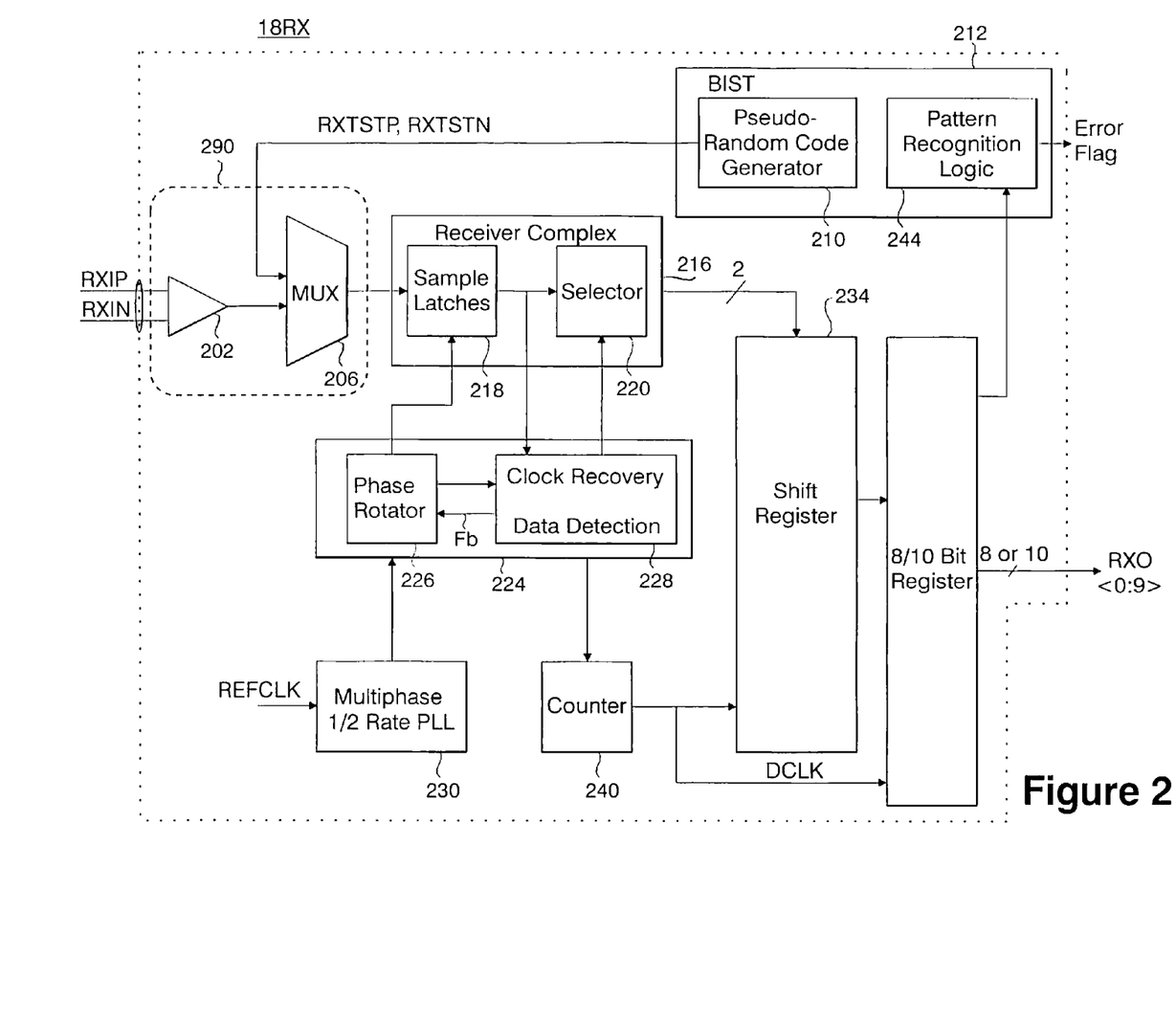
FIG. 2 is a block diagram of a receiver link in a conventional SerDes core.

In order to clearly describe testing of the SerDes core 10a or 10b, the design and function of links 18RX and 18TX will be described with reference to FIG. 2 and FIG. 3, respectively. FIG. 2 shows a conventional receiver link 18RX. In an operational mode receiver link 18RX receives actual differential signals RXIP, RXIN in a serial stream. The received actual signals are sensed and amplified by receiver block 202, and then provided to multiplexer (MUX) 206. In a test mode a pseudo-random code (PRC) generator 210 of BIST block 212 generates a serial stream of test differential signals RXTSTP, RXTSTN which are provided to the MUX 206. Depending on whether the receiver link 18RX is operating in the operational mode or in the test mode, the MUX 206 transfers the amplified actual signals or the test signals to a receiver complex 216 where the signals are sampled and latched.

In one embodiment, the receiver block 202 may be a differential amplifier. The receiver complex 216 include sample latches 218 and a selector 220, and a timing complex 224, having a phase rotator 226 and a clock recovery/data detection (CR/DD) block 228, which operate together in a loop including feedback signals fb for coordinating timing of sampling and latching of the data. A multi-phase ½ rate phase lock loop (PLL) 230 receiving a reference clock signal REFCLK provides clock signals to the timing complex 224. The CR/DD block 228 uses a clock recovery algorithm to generate "early" and "late" signals when detected data edge positions are not at expected positions. The "early" and "late" signals are used to continually adjust the phase rotator 226 via the feedback signals fb for obtaining proper data detection. Two bits of data at a time pass through MUX 206 and receiver complex 216, and are then stored in a shift register 234, and then transferred to an 8/10 bit register 238. A counter 240 counts the number of bits transferred into the 8/10 bit register 238, and upon reaching the target number of 8 or 10 bits (depending on whether or not a 10 bit scheme is used) the counter 240 sends a signal DCLK to the 8/10 bit register 238 to release the 8 or 10 bits as output signals RXO<0:9> in parallel. During the test mode, the output signals RXO<0:9> are routed to a pattern recognition logic block 244 of the BIST block 212 which checks the received output signals RXO<0:9> for errors and outputs an error flag indicating when an error has been detected.

Figure 3:
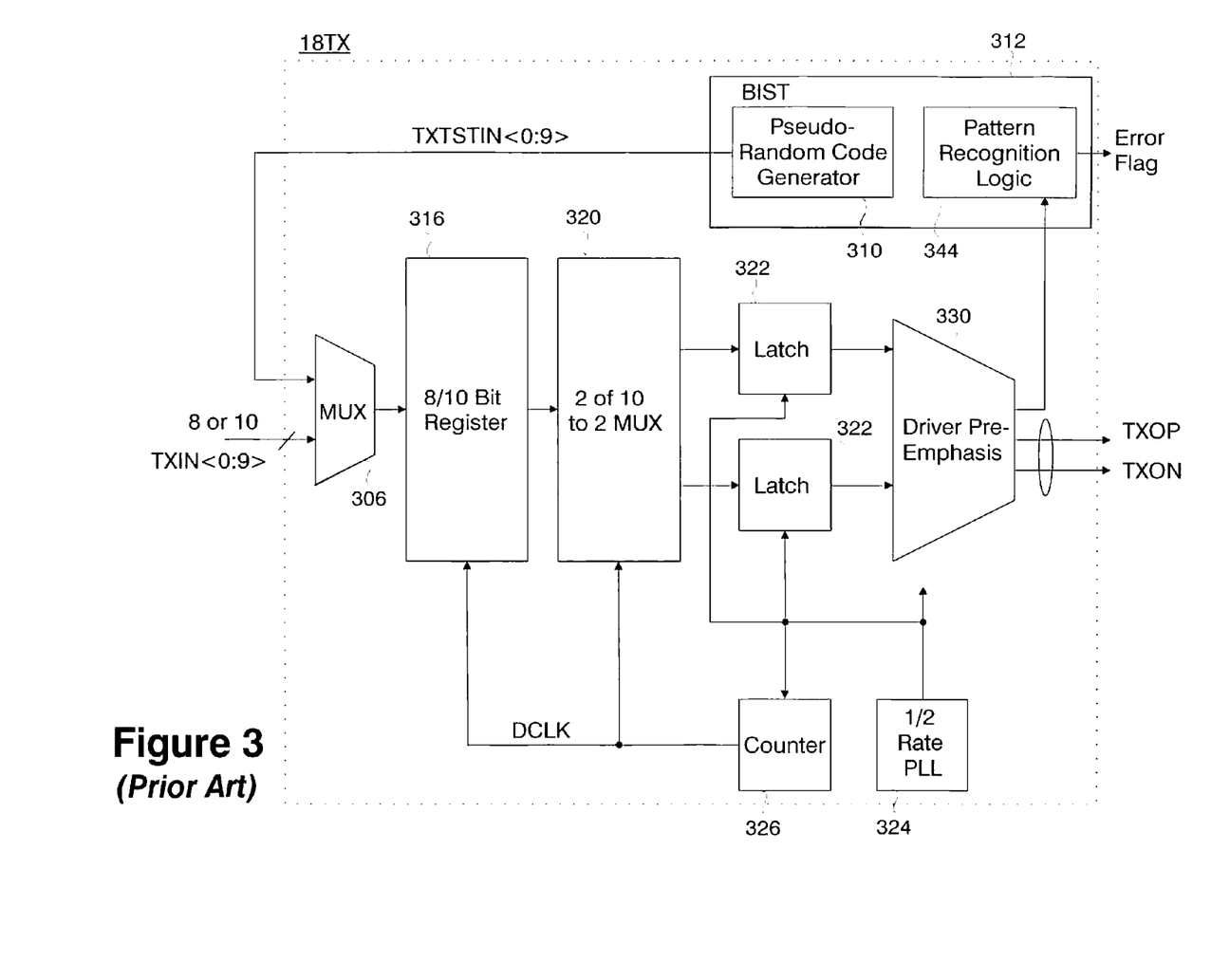
FIG. 3 is a block diagram of a transmitter link in a conventional SerDes core.

FIG. 3 shows a conventional transmitter link 18TX. In an operational mode, transmitter link 18TX receives actual signals TXIN<0:9> in parallel. The received actual signals are provided to multiplexer (MUX) 306. In a test mode a pseudo-random code (PRC) generator 310 of a Built-In-Self-Test (BIST) block 312 generates a series of test signals TXTSTIN<0:9> in parallel which are provided to the MUX 306. Depending on whether the transmitter link 18TX is operating in the operational mode or in the test mode, the MUX 306 transfers the received actual signals or the test signals to an 8/10 bit register 316 where the incoming data is stored. The data (which may comprise single polarity signals or differential signal pairs) is transferred synchronously through a MUX 320 two bits at a time beginning with the least significant bit (LSB) and sequencing to the next significant bit, and is transferred therefrom into a pair of holding latches 322.

Counter 326 tracks the number of two bit pairs processed. Upon determining that all of the bits have been transferred from the 8/10 bit register 316 in a serial fashion a new 8/10 bit word is received and processed by the 8/10 bit register 316. The latches 322, controlled by ½ rate PLL 324, are operated at a ½ bit rate for forwarding the data to a driver/equalizer block (also known as a driver pre-emphasis block) 330. The driver/equalizer block 330 receives the two-bit stream and uses an alternating multiplexing scheme to create a full-rate differential data pair as output signals TXOP, TXON, as is known in the art. During the test mode, the output signals TXOP, TXON are routed to a pattern recognition logic block 344 of the BIST block 312, which outputs an error flag indicating when an error has been detected.

There are several disadvantages associated with the conventional system and method described for testing receiver links 18RX and transmitter links 18TX. First, each receiver and transmitter link, 18RX, 18TX must have a BIST block, which consumes space on the chip and consumes power. Second, the test time for each link is time consuming. Before testing each receiver and transmitter link 18RX, 18TX the respective receiver and transmitter link 18RX, 18TX must be operating with its respective PLL in a locked state. Alternatively the respective PLL may either be locked to a preset multiplied frequency of the REFCLK, or the receiver or transmitter link 18RX, 18TX may be used with any unspecified (garbage) data until the respective PLL reaches a locked state. Thus preparation of the respective PLL consumes time. Further time is consumed while ensuring proper seeding of the PRC generator of the respective BIST of each receiver and transmitter link, 18RX, 18TX prior to testing each link.

Third, MUX 206 is located along the critical path of the actual data signals RXIP, RXIN and the test data signals RXTSTP, RXTSTN, causing signal degradation due to extra signal impedance associated with the MUX 206. Fourth, the test data signals RXTSTP, RXTSTN transmitted by the BIST travel along a short path having a small noise impact relative to a path (not shown) traveled by the actual data signals RXIP, RXIN, so that in the test mode the low noise impact is not realistic. Fifth, the receiver block 202 is bypassed by the test data signals RXTSTP, RXTSTN, and therefore the receiver block 202 is excluded from the testing process.

A conventional test known as link verification partially alleviates the time consumption problems associated with individual testing of each link described above by configuring the receiver and transmit links 18RX and 18TX so that each transmitter link 18TX is paired and connected by a transmission line with one receiver link 18RX. During testing, each link of the 18TX, 18RX link pair being tested is operated in an operational mode until the respective PLL's reach a locked state. The PRC generator 310 of the BIST 312 in the 18TX link is seeded, after which it generates PRC testing data and transmits the testing data to the MUX 306 of the transmit link 18TX. The BIST 212 of the receiver link 18RX is disabled, or alternatively a BIST is not included with the receiver link 18RX. The test data is processed by the transmit link 18TX and transmitted via the transmission line to the paired receiver link 18RX which processes the test data and provides it to the pattern recognition logic block 344 of BIST 312 of the transmit link 18TX. Thus, only one PRC generator and one pattern recognition logic block is needed for each transmitter/receiver link pair, and only one delay is associated with locking the PPL's of the links of the receiver/transmitter link pair, and only one delay is associated with seeding the PRC generator. However, each transmitter/receiver link pair is isolated from other link pairs and must be tested individually. Furthermore, testing of the link pairs is not performed under a controlled noise environment.

Accordingly, a need exists for a system and a method for testing receiver and transmitter links of a high speed SerDes core which eliminates the problems associated with the prior art time, and minimizing the size of associated BIST units. A need further exists for a system and method for providing realistic noise conditions while testing the transmitter and receiver links. Finally, a need exists for a system and method for testing transmitter and receiver links of a high speed SerDes core without causing signal degradation during normal operation or during testing.

SUMMARY

It is an aspect of the present invention to provide a system and a method for testing receiver and transmitter links of a high speed SerDes core by combining receiver and transmitter links in groups of four or more links for sequential testing for minimizing testing time, and minimizing the size of associated BIST units.

It is a further aspect of the present invention to provide a system and method for providing realistic noise conditions while testing the transmitter and receiver links.

Finally, it is an aspect of the present invention to provide a system and method for testing transmitter and receiver links of a high speed SerDes core without causing signal degradation during normal operation or during testing.

Accordingly, the present invention provides a testing circuit in a serialization and deserialization (SerDes) core having a plurality of transmitter links and receiver links for testing a series of at least three alternating transmitter and receiver links. The testing circuit includes a built-in-self-test (BIST) macro for generating test data and transmitting the test data to a first link of the series of transmitter and receiver links, and for receiving processed test data from a last link of the series of transmitter receiver links; and at least one test transmission line for transmitting test data receiver by a link of the series of transmitter and receiver links to a next link of the series of transmitter and receiver links, wherein the at least one test transmission line connects the at least three transmitter and receiver links. Furthermore, the present invention provides a method for testing a series of links having at least three alternating transmitter and receiver links of a plurality of transmitter and receiver links in a serialization and deserialization (SerDes) core including the steps of: generating at least one test data signal; transmitting the at least one test data signal sequentially through the transmitter and receiver links of the series of links; receiving the at least one test data signal from a last link of the series of transmitter and receiver links; and checking the at least one test data signal received from the last link of the series of transmitter and receiver link for error.

BRIEF DESCRIPTION OF THE FIGURES

The above and other features and advantages of the present invention will become more readily apparent from the following detailed description of the invention, taken in conjunction with the accompanying drawings in which.

DETAILED DESCRIPTION OF THE INVENTION

The present invention provides a built-in self test system for testing a SerDes core having a plurality of transmitter and receiver links by sequentially testing the transmitter links, resulting in savings in test time and reducing space consumed on the SerDes core's chip. The receiver link is provided with a receiver circuit having a multiplexer (MUX) function, without using a MUX device along the path of data signals passing through the receiver link in order to avoid data signal degradation due to impedances associated with conventional MUX devices. Furthermore, during testing of the SerDes core, transmission lines provided between the receiver and transmitter links are provided with controlled noise injection mechanisms for realistic testing. During normal operation (i.e., operation using actual data) of the SerDes core the transmission lines are disconnected between the links and grounded in order to provide a noise shield between the receiver and transmitter links.

Figure 4:
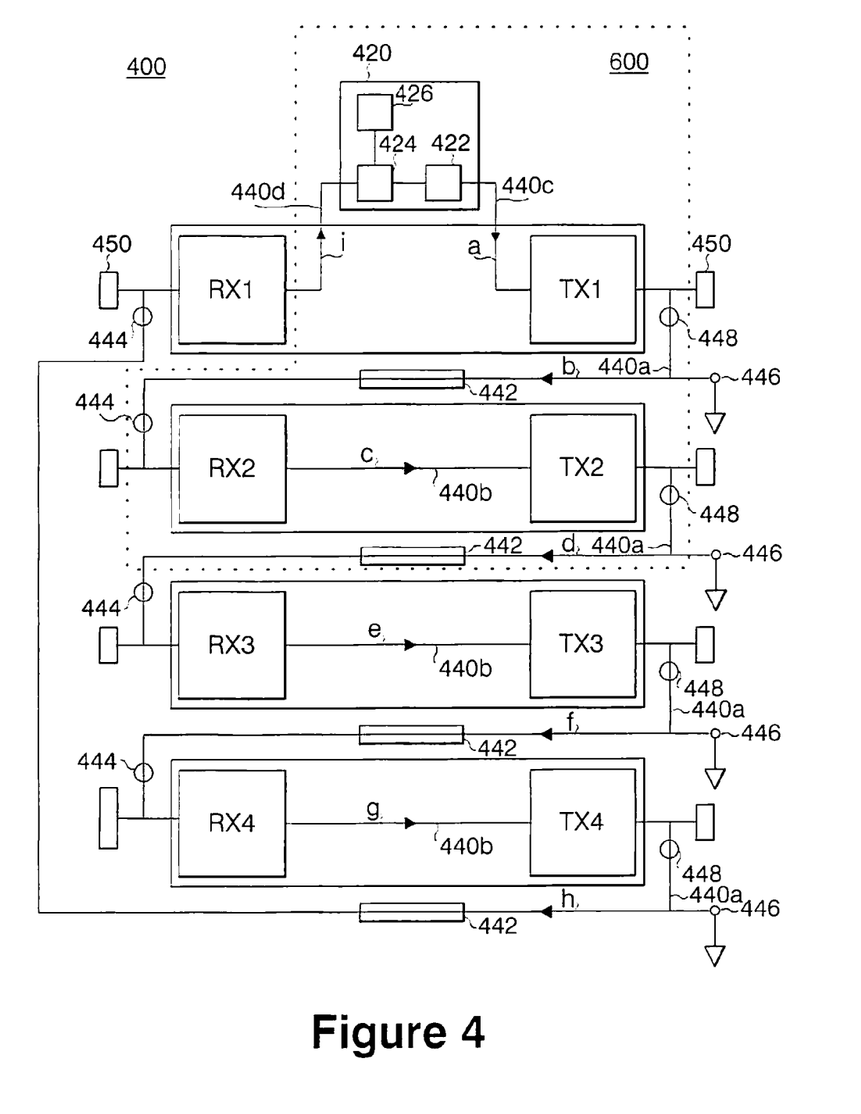
FIG. 4 is a block diagram of a SerDes core configured for sequential testing in accordance with the present invention.
Figure 5:
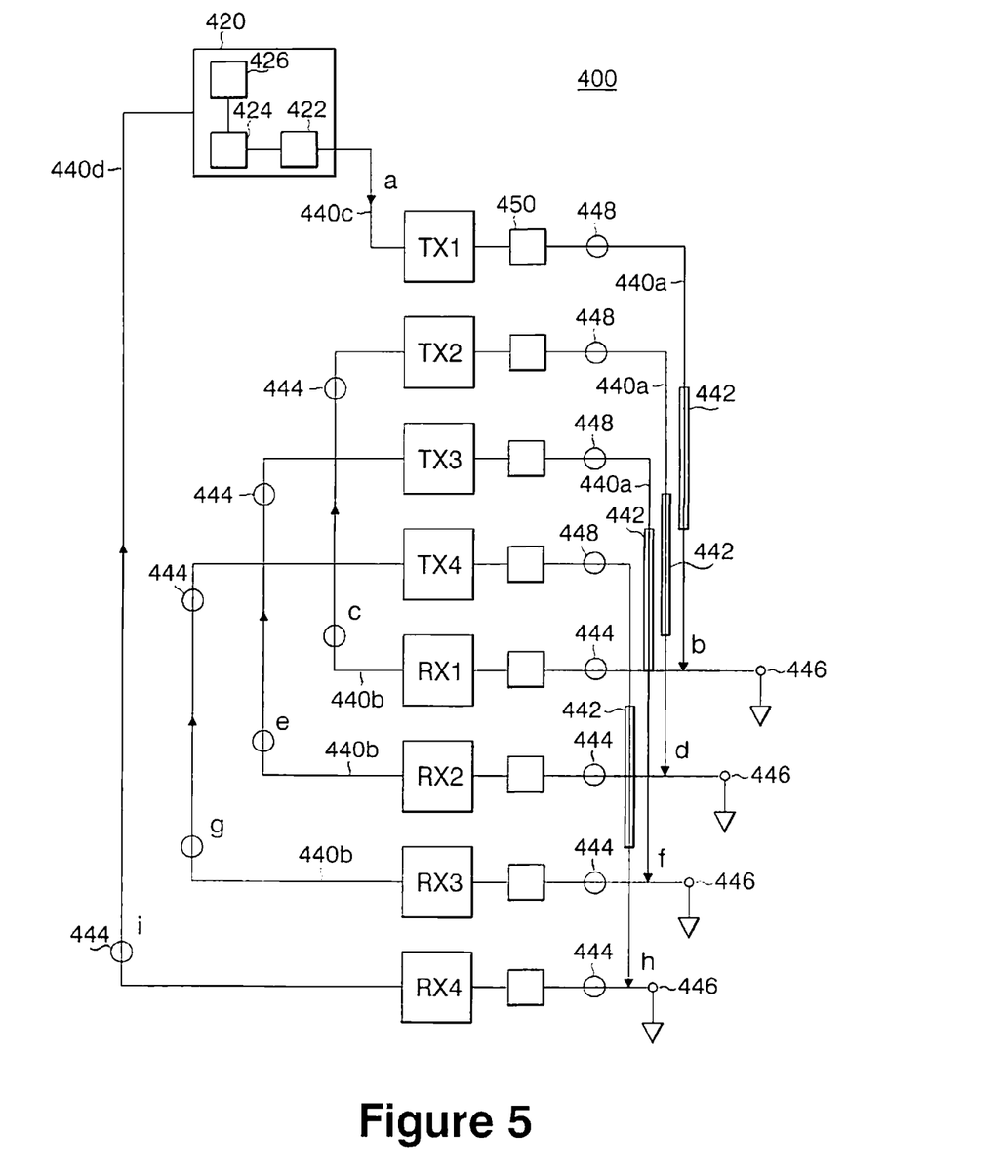
FIG. 5 is a block diagram of another embodiment of a SerDes core configured for sequential testing in accordance with the present invention.

An exemplary built-in self-test system 400 in accordance with the present invention for testing a SerDes core having transmitter links TX1–4 and receiver links RX1–4 is shown in FIGS. 4 and 5. The links of the SerDes core shown in FIG. 4 are arranged in a stacked pair configuration, with one transmitter link TXn and one receiver link RXn, where n=1–4, forming each pair. The links of the SerDes core of FIG. 5 are arranged in another configuration with the transmitter links TX1–4 individually stacked on top of individually stacked receiver links RX1–4. The receiver links RX1–4 and transmitter links TX1–4 may have similar or equivalent configuration as the prior art links 18RX of FIGS. 2 and 18TX of FIG. 3, respectively or other links known or not yet known in the art.

One skilled in the art can appreciate that the SerDes core of FIGS. 4 and 5 may include a greater number of transmitter and receiver links and that the built-in self-test system 400 can be expanded for testing the greater number of links, as long as an equal number of transmitter links and receiver links are tested. The built-in self-test system is not limited to use with the SerDes core configurations shown in FIGS. 4 and 5, but may be adapted for use with SerDes cores having other configurations.

The self-test system 400 includes a BIST macro 420, a plurality of transmission paths 440*a*–*d*, including a plurality of transmission paths 440*a,b* and one transmission path 440*c* and 440*d*, respectively. The transmission paths 440*a*–*d* provide a connection between the BIST macro 420 and links of a series of alternating receiver links RXn and transmitter links TXn. Pins 450 are provided for connecting the links TXn, RXn to a chip on which the SerDes resides. The BIST macro 420 includes a PRC generator 422 for generating PRC data and providing the PRC data as a serial stream of test data, a pattern recognition module 424 checking for errors in test data received by the BIST macro 420 by comparing the received test data to expected data, and generating an error flag accordingly, and an error flag register 426 for storing the error flag, as is known in the art. Transmission paths 440*b*–*d* include parallel transmission lines for transmitting 8 or 10 bits of data in parallel transmission. Transmission path 440*a* preferably includes two transmission lines for transmitting differential signals in serial transmission. Alternately, transmission path 440*a* includes one transmission line for transmitting a single ended signal in serial transmission.

Each transmission path 440*a* provides a data path from an associated transmitter link TXn to an associated receiver link RXn. Each transmission path 440*b* provides a data path from an associated receiver link RXn to an associated transmitter link TXn. The transmission path 440*c* provides a data path from the BIST macro 420 to an associated transmitter link TXn, and transmission path 440*d* provides a data path from an associated receiver link RXn to the BIST macro 420.

Each transmission path 440*a* is preferably designed to have a transmission line characteristic, such as an impedance of 50 ohms, equivalent to a characteristic of transmission lines used for transmitting actual data during normal operation of the SerDes core. During normal operation, the SerDes core experiences a level of background noise, such as from a clock buffer, the PLL and other logic circuits. As the circuits generating the background noise are not switched on during the test mode, each transmission path 440*a* preferably includes a random noise generator 442 for injecting controlled noise during transmission of the test data for providing a more realistic noise environment in order to better simulate transmission of actual data during operation of the SerDes core.

Each transmission path 440*a* further includes first, second and third switches 444, 446 and 448, respectively. When the SerDes core is in an operational mode, (i.e. normal operation after a testing mode) the first switch 444 of each of the transmission paths 440*a* disconnects the transmission path 440*a* from the associated receiver link RXn, and connects an incoming actual data transmission path (not shown) to the associated receiver link RXn, for reducing loading of the actual data transmission paths. In one embodiment, the first switch 444 includes a multiplexer. The first switch 444 may be located external to the associated receiver link RXn. Preferably the first switch 444 is embedded within the associated receiver link RXn, such as box 290 shown in FIG. 2. In a preferred embodiment shown in FIG. 7 and discussed below, the first switch 444 is a receiving circuit 700 having a multiplexer function.

Similarly, when the SerDes core is in the operational mode, the second switch 446 of each transmission path 440*a* connects the transmission path 420*a* to ground for shielding noise between the associated transmitter link TXn and receiver link RXn.

Similarly, when the SerDes core is in the operational mode, the third switch 448 of each transmission path 440*a* disconnects the transmission path 440*a* from the associated transmitter link TXn, and connects an outgoing actual data transmission path (not shown) to the associated transmitter link TXn. In one embodiment, the third switch 448 includes a demultiplexer.

Prior to commencing testing of the SerDes core, the transmitter links TXn and receiver links RXn are reset and then allowed to run until respective Phase Lock Loop modules (PLL) included in the links TXn, RXn have reach a locked state. Seeding of the PRC generator 422 is performed. Once the PRC generator 422 is properly seeded, a stream of test data in parallel sets (8 or 10 bits wide) is transmitted through transmission path 440*c* along path "a" to the first transmitter link TX1 of the series of alternating links.

The transmitter link TX1 outputs each set of test data as a serial stream of complimentary data pairs and transmits the test data along path "b" via one of the transmission paths 440*a* to receiver link RX2. Receiver link RX2 receives the test data, outputs the test data in parallel sets (8 or 10 bits wide), and transmits the test data along path "c" via one of the transmission paths 440*b* to transmitter link TX2. The test data is transmitted similarly along paths "d"–"h" to alternating links RX3, TX3, RX4, TX4, respectively until it reaches the last receiver link RX1 of the series of alternating links. Receiver link RX1 transmits the test data in parallel sets (8 or 10 bits wide) along path "i" via transmission path 440*d* to the BIST macro 420. The pattern recognition module 424 of the BIST macro 420 compares the received test data to expected data and sets the error flag if an error is found.

It can be appreciated by one skilled in the art that multiple built-in self-test systems 400 may be included with one SerDes core for testing individual loops of transmitter and receiver links of desired sizes, so that the transmitter and receiver links of each loop are tested sequentially.

Figure 6:
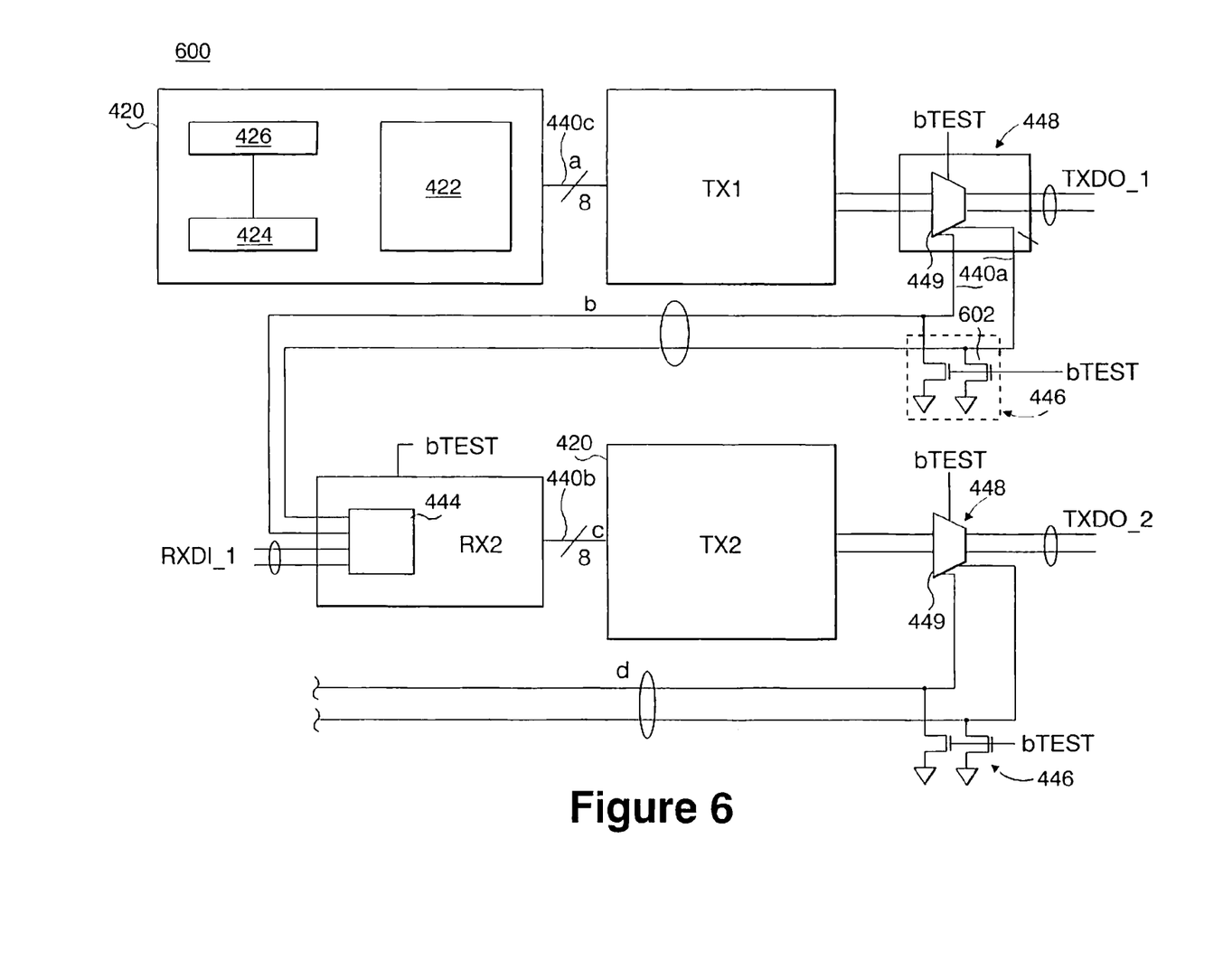
FIG. 6 is a circuit diagram of a segment of a SerDes core configured for sequential testing in accordance with the present invention.

A preferred embodiment of section 600 of FIG. 4 is shown in greater detail in FIG. 6. First switch 444 is embedded in the RXn. The random noise generator 442 is not shown. The second switch 446, connected to an associated transmission path 440a, is shown to include a set of transistor switch devices 602 that are tied to ground. A control signal bTEST is applied to the gates of the transistor switch devices. Control signal bTEST is indicative of whether the SerDes is in the testing mode (bTEST=0) or in the operational mode (bTEST=1). When the SerDes is in the operational mode, bTEST controls the set of transistor switch devices 602 to tie the associated transmission path to ground.

The third switch 448 includes DMUX 449, which is connected to an associated transmission path 440a and an associated outgoing actual data transmission path TXDO_1, 2. The DMUX 449 receives control signal bTEST and data output by an associated transmitter link TXn. For bTEST=0 the DMUX 449 outputs the output data to the associated transmission paths 440a. For bTEST=1 the DMUX 449 outputs the output data to the associated outgoing actual data transmission path TXDO_1,2.

Figure 7:
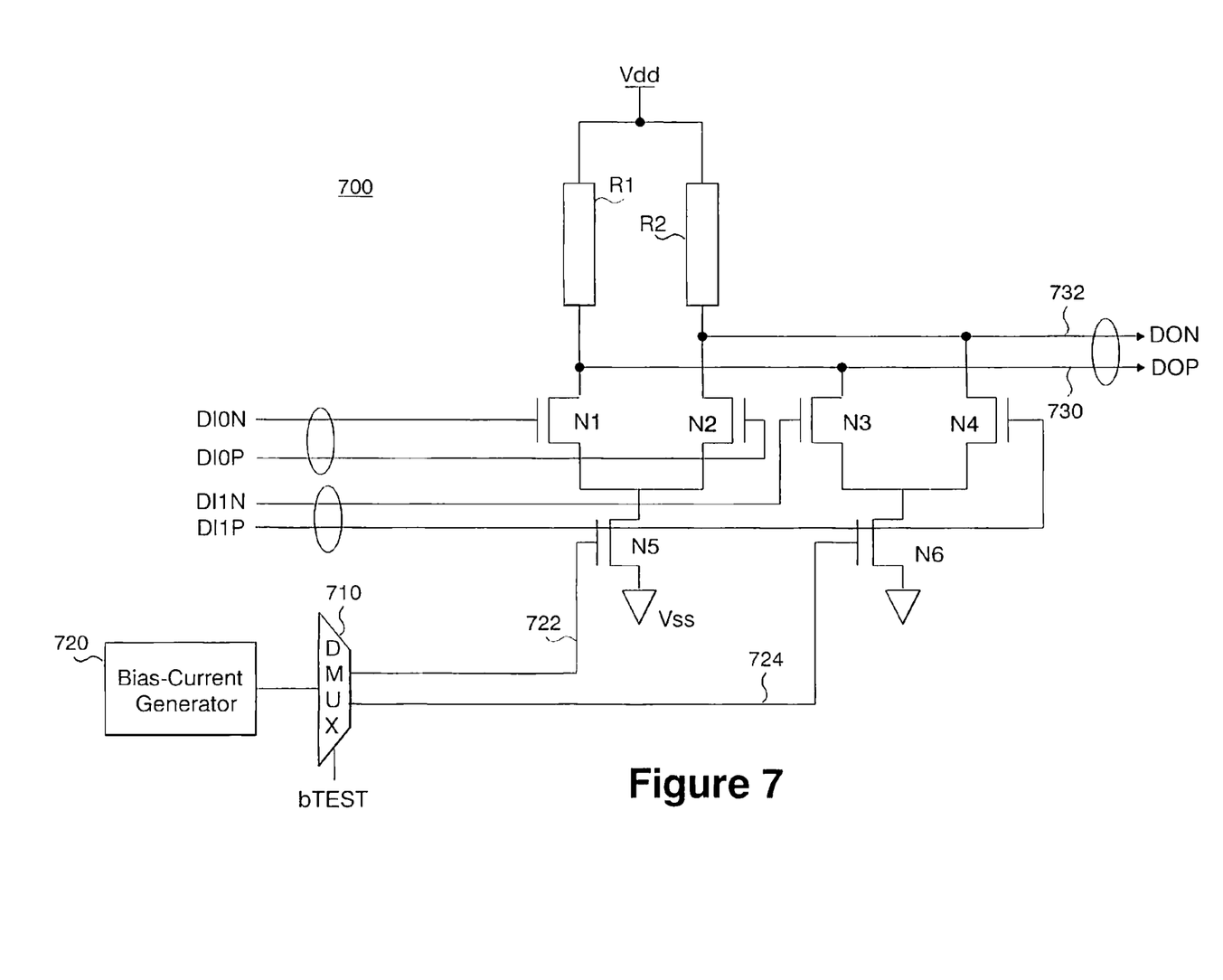
FIG. 7 is a circuit diagram of receiver link of a SerDes core in accordance with another embodiment of the present invention.

In FIG. 7 a receiver circuit 700 having a MUX function is shown. In the preferred embodiment first switch 444 includes receiver circuit 700. The receiver circuit 700 is preferably implemented in each receiver link RXn, where each receiver link RXn has similar components to the conventional receiver link 18RX shown in FIG. 2, except that receiver circuit 700 replaces box 290 of FIG. 2 that includes the receiver block 202 and the MUX 206. In the conventional receiver link 18RX, the MUX 206 of box 290 lies in the critical path traversed by actual data signals being processed by the conventional receiver link 18RX during operation of the SerDes, in which impedance associated with the MUX 206 causes degradation of the actual data signals. Furthermore, in the conventional receiver link 18RX test data is not routed through the receiver block 202, so that receiver block 202 is bypassed, and is not tested during the test mode.

The receiver circuit 700 overcomes at least the above mentioned problems associated with box 290 of the conventional receiver link 18RX by eliminating a MUX from the path of the actual data signals, and by not causing the test data to bypass critical elements of the receiver link RXn.

The receiver circuit 700 includes a pair of pull-up resistors R1, R2, a first pair of nMOS devices N1, N2 having an associated first tail device N5, and a second pair of nMOS devices N3, N4 having an associated second tail device N6. A DMUX 710 receiving control signal bTEST and a current signal from an existing bias current generator 720 outputs a signal along one of a first and second path 722, 724, connected to a gate of the tail devices N5, N6, respectively, for activating the tail device N5, N6. The path, 722 or 724, along which the signal output by the DMUX 710 will travel is determined by the control signal bTEST.

Actual input signals DI0N, DI0P and test input data input signals DI1N, DI1P are provided to the receiver circuit 700. Preferably the test and data input signals are differential pairs. Test input signals DI1N, DI1P are input to the gates of devices N3, N4, respectively, and actual input signals DI0N, DI0P are input to the gates of devices N1, N2, respectively. When bTEST=0 (testing mode), tail device N6 is activated, test input signals DI1N, DI1P are transferred to signal lines 730, 732, respectively, and output as signals DON, DOP, respectively. When bTEST=1 (operational mode) tail device N5 is activated, actual input signals DI0N, DI0P are transferred to signal lines 730, 732, respectively, and output as signals DON, DOP, respectively. It is contemplated that other devices having a similar function may be used to replace devices R1, R2, and N1–6.

It is contemplated that a modification could be made to a transmitter link such as 18TX similar to the modification of 18RX shown in FIG. 7. The MUX 306 of FIG. 3 could be replaced by a DMUX receiving control signal bTEST and located off of the path of the actual data for controlling MOS devices located along the path of the test data and actual data for selecting one of the test data and actual data.

It is further contemplated that a SerDes core may be provided with a BIST macro and associated circuitry capable of outputting parallel test data and receiving serial test data or vice versa, where a Pattern Recognition Logic unit of the BIST checks the received test data with expected data that is in the same form (parallel or serial) as the received test data for checking the received data for errors.

In conclusion, a built-in testing system is provided for serial testing a plurality of receiver and transmitter links of a SerDes core, thus saving time and space consumed by multiple BIST macros. A controlled and realistic noise environment is provided during the test mode, and a noise shield is provided during the operational mode. The receiver links eliminate signal degradation during the operational mode due to impedance associated with a MUX, and the receiver link is completely tested during the test mode, without bypassing critical components.

What has been described herein is merely illustrative of the application of the principles of the present invention. For example, the systems described above and implemented as the best mode for operating the present invention are for illustration purposes only. As a particular example, for instance, other design configurations may be used which provide similar operation as the system described herein. In other words, other arrangements and methods may be implemented by those skilled in the art and are contemplated to be within the scope of the appended claims.

The invention claimed is:

1. A testing circuit in a serialization and deserializtion (SerDes) core having a plurality of transmitter links and receiver links for testing a series of at least three alternating transmitter and receiver links, the testing circuit comprising:
   a built-in-self-test (BIST) macro for generating test data and transmitting the test data to a first link of the series of transmitter and receiver links, and for receiving processed test data from a last link of the series of transmitter and receiver links; and
   at least one test transmission line for transmitting test data received by a link of the series of transmitter and receiver links to a next link of the series of transmitter and receiver links, wherein the at least one test transmission line connects the at least three transmitter and receiver links.

2. The testing circuit of claim 1, wherein the at least one test transmission line includes a noise generator.

3. The testing circuit of claim 1, wherein the at least one test transmission line includes at least one switch for tying a transmission line of the at least one test transmission line to ground when the SerDes core is in an operational mode for processing actual data.

4. The testing circuit of claim 1, wherein the at least one test transmission line includes a switch for decoupling a test transmission line of the at least one test transmission line from a link of the at least three transmitter and receiver links, and coupling at least one actual data line to the link when the SerDes core is in an operational mode for processing actual data.

5. The testing circuit of claim 1, wherein the at least one test transmission line includes:
   a first transmission line connecting a transmitter link of the series of transmitter and receiver links to a next receiver link in the series of transmitter and receiver links for serial data transmission; and
   a second transmission line connecting a receiver link of the series of transmitter and receiver links to a next transmitter link in the series of transmitter and receiver links for parallel data transmission.

6. The testing circuit of claim 5, wherein the first transmission line includes a noise generator.

7. The testing circuit of claim 6, wherein the first transmission line includes a switch for tying the first transmission line to ground when the SerDes core is in an operational mode for processing actual data.

8. The testing circuit of claim 5, wherein the first transmission line includes a switch for decoupling the first transmission line from the transmitter link, and for coupling at least one actual data line to the transmitter link when the SerDes core is in an operational mode for processing actual data.

9. The testing circuit of claim 5, wherein the next receiver link includes a switch for decoupling the first transmission line from the next receiver link, and for coupling at least one actual data line to the next receiver link when the SerDes core is in an operational mode for processing actual data.

10. The testing circuit of claim 1, wherein the BIST macro transmits the test data in parallel, and the BIST macro receives the processed test data in parallel.

11. The testing circuit of claim 1, wherein a receiver link of the series of transmitter and receiver links includes a receiver device for receiving and amplifying the test data and the actual data, and selecting one of the test data and the actual data for processing by the receiver link, the receiver device comprising:
   an amplification block having first and second input amplifying devices for receiving the test data and the actual data, respectively; and
   a demultiplexer (DMUX) receiving a bias current and a control signal indicative of whether the SerDes core is in a testing mode or an operational mode for controlling the first and second amplifying devices to process one of the received test data and actual data in accordance with the control signal;
   wherein the DMUX lies in a path other than a path followed by the actual data.

12. The testing circuit of claim 11, wherein the testing data passes through the amplification block.

13. The testing circuit of claim 11, wherein the DMUX is connected by first and second signal paths to the first and second input amplifying device, respectively, for applying the bias current to one of the first and second input amplifying device; and
   wherein the DMUX transmits the current bias along one of the first and second signal path in accordance with the control signal.

14. The receiver of claim 13, wherein the testing data passes through the amplification block.

15. The receiver device of claim 13, wherein the DMUX is connected by first and second signal paths to the first and second input amplifying device, respectively, for applying the bias current to one of the first and second input amplifying device; and
   wherein the DMUX transmits the current bias along one of the first and second signal path in accordance with the control signal.

16. A receiver device for receiving and amplifying test data and actual data, and selecting one of the test data and the actual data, the receiver device comprising:
   an amplification block having first and second input amplifying devices for receiving the test data and the actual data, respectively; and
   a demultiplexer (DMUX) receiving a bias current and a control signal indicative of whether the receiver device is in a testing mode or an operational mode for controlling the first and second amplifying devices to process one of the received test data and actual data in accordance with the control signal;
   wherein the DMUX lies in a path other than a path followed by the actual data.

17. A method for testing a series of links having at least three alternating transmitter and receiver links of a plurality of transmitter and receiver links in a serialization and deserialization (SerDes) core comprising the steps of:
   generating at least one test data signal;
   transmitting the at least one test data signal sequentially through the transmitter and receiver links of the series of links;
   receiving the at least one test data signal from a last link of the series of transmitter and receiver links; and
   checking the at least one test data signal received from the last link of the series of transmitter and receiver links for error.

18. The method of claim 17, further including the step of generating noise while transmitting at least one test data signal to a next link of the series of links.

19. The method of claim 17, further including the steps of:
   receiving at least one test data signal and at least one actual data signal in a link of the series of transmitter links;
   selecting one of the at least one test data signal and the at least one actual data signal; and
   amplifying the selected data signal.

20. The method of claim 19, wherein during the receiving, selecting and amplifying steps the selected data signal is loaded by substantially only an impedance associated with one MOS device.

21. The method of claim 17, wherein a transmission line connects a transmitter link of the series of transmitter links to a receiver link of the series of receiver links, further including the step of tying the transmission line to ground when the SerDes core is in an operational mode for processing actual data.

* * * * *